United States Patent [19]

Diernaz

[11] Patent Number: 5,323,830
[45] Date of Patent: Jun. 28, 1994

[54] TIRE WITH BEADS HAVING FRUSTOCONICAL SEATS AND PROVIDED WITH AT LEAST ONE MAIN BEAD RING AND ONE AUXILIARY BEAD RING

[75] Inventor: Christian Diernaz, Riom, France

[73] Assignee: Compagnie Generale des Etablissements Michelin - Michelin & Cie, Clermont-Ferrand Cedex, France

[21] Appl. No.: 958,348

[22] PCT Filed: Jul. 12, 1991

[86] PCT No.: PCT/FR91/00569
§ 371 Date: Dec. 17, 1992
§ 102(e) Date: Dec. 17, 1992

[87] PCT Pub. No.: WO92/01578
PCT Pub. Date: Feb. 6, 1992

[30] Foreign Application Priority Data
Jul. 17, 1990 [FR] France .................. 90 09211

[51] Int. Cl.⁵ ............... B60C 15/024; B60C 15/05
[52] U.S. Cl. .................. 152/544; 152/542; 152/545; 152/552
[58] Field of Search ........... 152/454, 544, 545, 539, 152/DIG. 9, 543, 555, 546, 548, 550–552

[56] References Cited

U.S. PATENT DOCUMENTS

| | | | |
|---|---|---|---|
| 2,501,372 | 3/1950 | Benson | 152/546 |
| 3,111,976 | 11/1963 | Delobelle | 152/545 |
| 4,061,172 | 12/1977 | Yoshida et al. | 152/546 |
| 4,076,066 | 2/1978 | Verdier | 152/454 |
| 4,345,634 | 8/1982 | Giron | 152/454 |
| 4,365,659 | 12/1982 | Yoshida et al. | 152/544 |
| 4,377,193 | 3/1983 | Smith | 152/545 |
| 4,554,960 | 11/1985 | Pompier | |
| 4,700,765 | 10/1987 | Masclaux | |

FOREIGN PATENT DOCUMENTS

| | | | |
|---|---|---|---|
| 2425743 | 12/1975 | Fed. Rep. of Germany | 152/544 |
| 2901719 | 7/1979 | Fed. Rep. of Germany | |
| 2936337 | 3/1981 | Fed. Rep. of Germany | 152/545 |
| 2346171 | 10/1977 | France | |
| 2432946 | 3/1980 | France | |

Primary Examiner—Michael W. Ball
Assistant Examiner—R. Robey
Attorney, Agent, or Firm—Brumbaugh, Graves, Donohue & Raymond

[57] ABSTRACT

In order to remedy the drawbacks consisting of separations at the end of the upturns (50) of the carcass reinforcement (1) of a tire having frustoconical seats as well as the rapid wear of the bead protectors, said tire is provided with beads (B) each of which has an auxiliary bead ring (4) located in the part intended to cover the tire flange (13), a reinforcement ply (5) being wound around the bead ring (4) in order to form two layers (51) and (52) which extend to the tip (6) of the bead (B).

7 Claims, 2 Drawing Sheets

TIRE WITH BEADS HAVING FRUSTOCONICAL SEATS AND PROVIDED WITH AT LEAST ONE MAIN BEAD RING AND ONE AUXILIARY BEAD RING

BACKGROUND OF THE INVENTION

The present invention relates to a tire with radial carcass reinforcement anchored in each bead with at least one bead ring, each bead having a seat which is inclined with respect to the axis of rotation of the tire by an angle of more than 5°, and generally at least equal to 15°±1°. Radially on top of the radial carcass reinforcement, there is a crown reinforcement consisting of one or more plies of cords or cables.

In each bead, axially to the outside of the upturn of the carcass ply, there are arranged, in known manner, one or more plies of textile or metal cords or cables oriented at a slight angle with respect to the circumferential direction of the tire, the radially outer end of said ply or plies being located either above or below the end of the upturn of the carcass reinforcement, the radially inner end being possibly located in the toe of the bead.

This reinforcement armature in each bead has the function of stiffening the rubber mix present axially to the outside of the upturn of the carcass reinforcement. It gives rise to separations with ruptures of rubber at its radially outer end. Furthermore, in view of the profile of the base of the bead, which is designed as a function of the profile of the service rim on which the tire is mounted, the contact pressure between the bead and the rim is very high between the inclined portion of the base of the bead and the inclined seat of the rim. The same is true between the flange of the rim and the corresponding portion of the tire, the tire being inflated at its operating pressure but not under load. On the other hand, the part of the bead located immediately above the rim flange, and not in contact with said flange when the tire is inflated, assumes contact with the rim flange under the effect of the load applied to the tire from the contact ellipse between said tire and the ground. The slippage between the tire rubber and the metal of the service rim is substantial, resulting in degradation by resulting rapid wear of the portion of the bead referred to above and which is even greater since foreign bodies, such as grains of sand and dust may enter between the rubber and the metal.

From EP Application 0 168 754, tires are known in which the beads are provided with two bead rings, a main bead ring around which a radial carcass reinforcement can be anchored and an auxiliary bead ring around which a reinforcement ply can be wound. This is, of course, a tire for passenger cars intended to be mounted on a rim provided with a circumferential protrusion on the rim seat so as to counteract the unwedging of the bead. This type of tire generally does not present any damage at the level of the upturn of the carcass reinforcement or at the level of the ends of the reinforcement ply.

SUMMARY OF THE INVENTION

In order to remedy the above-indicated drawbacks, that is to say, in order to improve the resistance of the lower region of the tire to the degradation of the rubber forming it, as well as the resistance of the strengthening reinforcement to separation, a tire, in accordance with the invention, having a radial carcass reinforcement, a crown reinforcement and two beads, each reinforced by at least one bead ring around which the carcass reinforcement is wound and an auxiliary bead ring around which a ply of cords or cables is wound, is provided for use on a rim with seats inclined by an angle of 15°±1° with respect to the axis of rotation, having a nominal radius $R_N$ and circular rim flanges of radius $\rho_2$ and of radius $R_J$, with respect to the axis of rotation, these flanges being connected to the seats by circular portions of radius $\rho_1$, is characterized by the fact that:

on the one hand, the base of each bead has, seen in meridian section, a profile comprising a generatrix of variable inclination with respect to the axis of rotation, the axially inner portion forming an angle of between 25° and 30° with respect to said axis and the axially outer portion forming an angle of between 15° and 20°, this generatrix being extended axially to the outside by portions in the shape of a circular arc having radii substantially equal to the radii $\rho_1$ and $\rho_2$, respectively, of the rim profile, the tip of the base of the bead furthest from the axis of rotation being at a distance from said axis of $R_B$ less than the radius $R_J$, of the rim flange, and on the other hand, the auxiliary bead ring is located in the portion of the bead intended to cover the rim flange, such that the ratio $$S = \frac{R_J - R_B}{R_I - R_B}$$

is equal to at least 0.1, $R_I$ being the inner radius of the bead ring, and the reinforcement ply of cords or cables is wound around the auxiliary bead ring and forms two layers, one of which at least extends to the tip of the bead, the cords or cables forming an angle of between 90° and 45° with the circumferential direction of the tire.

By "auxiliary bead ring", there is to be understood any circular ring having a cross section of any shape and of any composition to the extent that said ring has a modulus of extension of at least 4000 MPa.

This ring can be formed, for instance, of simple plastic material (polyamide, polyester), or it may also be composed, like ordinary bead rings, of several cords or cables which are assembled together and then coated in a plastic material which forms the assembly.

The auxiliary bead ring may advantageously be a bead ring of braided type of circular cross section the section radius of which is between 5 and 10 mm. This type of bead ring exhibits a certain lengthening under action of force, which facilitates the mounting of the tire and, in particular, the mounting of the axially outer part of each bead.

In order to permit better contact between the frustoconical zone of the bead and the frustoconical seat of the rim, the two layers of cords or cables resulting from the winding of the reinforcement ply around the auxiliary bead ring, are superimposed one on the other below the main bead ring and extend axially to the inside up to the toe of the bead. One of these layers, preferably the radially inner layer, is extended into the toe of the bead rising in it in order to reinforce it. These preferred solutions make it possible, on the one hand, to avoid the unwinding of the carcass reinforcement around the bead rings and, on the other hand, to reinforce the base of the beads against injuries upon mounting.

This reinforcement is more effective if the angles which the textile or metal cords or cables of the layers make are equal to 90° with respect to the circumferential direction.

In order not to reduce the life of the end of the upturn of the carcass reinforcement, it is advantageous for said end to be located on a radius which is less than the outer radius of the auxiliary bead ring (contrary to the embodiment shown in the drawings). Similarly, a depression or cavity 7 (FIG. 1) can be formed in the portion of the side wall located immediately radially above the auxiliary bead ring, which permits less generation of heat, faster dissipation of this heat at the level of the end of the upturn of the carcass reinforcement, while compensating insofar as possible for the increase in weight of the tire due to the use of an auxiliary bead ring. Furthermore, this depression makes it possible to retain a constant thickness of the side wall over a greater height and therefore make this side wall more effective.

The following description, read with reference to the accompanying drawing, which is given by way only of illustration, will make the reduction to practice of the invention more easily understood.

DESCRIPTION OF PREFERRED EMBODIMENTS

Figure 1:
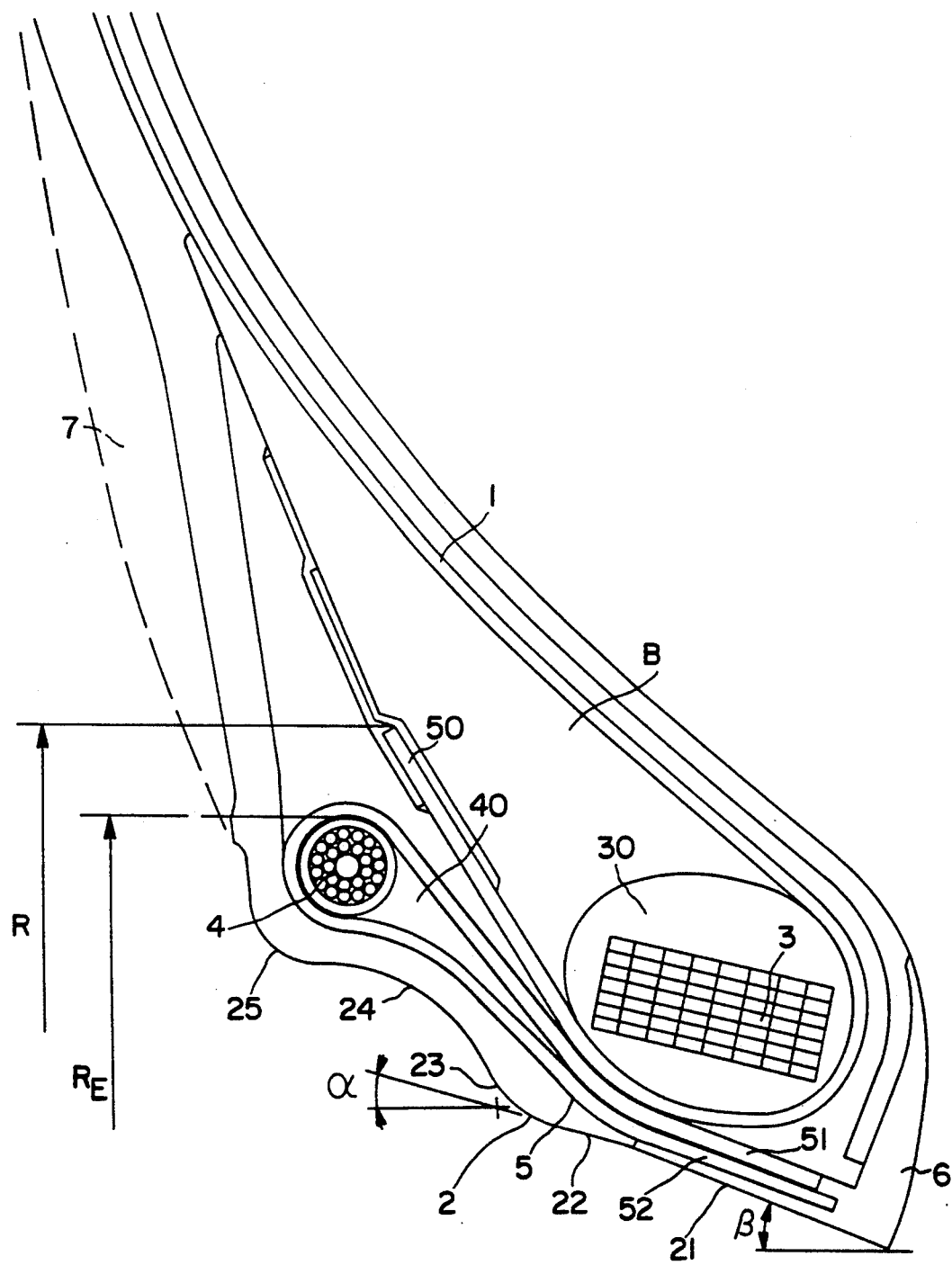
FIG. 1 is a meridian view of the bead of the tire of the invention.

The 315/80 R 22.5 tire of FIG. 1 has a bead (B) provided with a main bead ring 3 with rectangular cords, coated in a rubber mix 30 around which there is wound a carcass reinforcement 1, thus creating an upturn 50 the end of which is located at a distance R equal to 318 mm from the axis of rotation of the tire.

Figure 2:
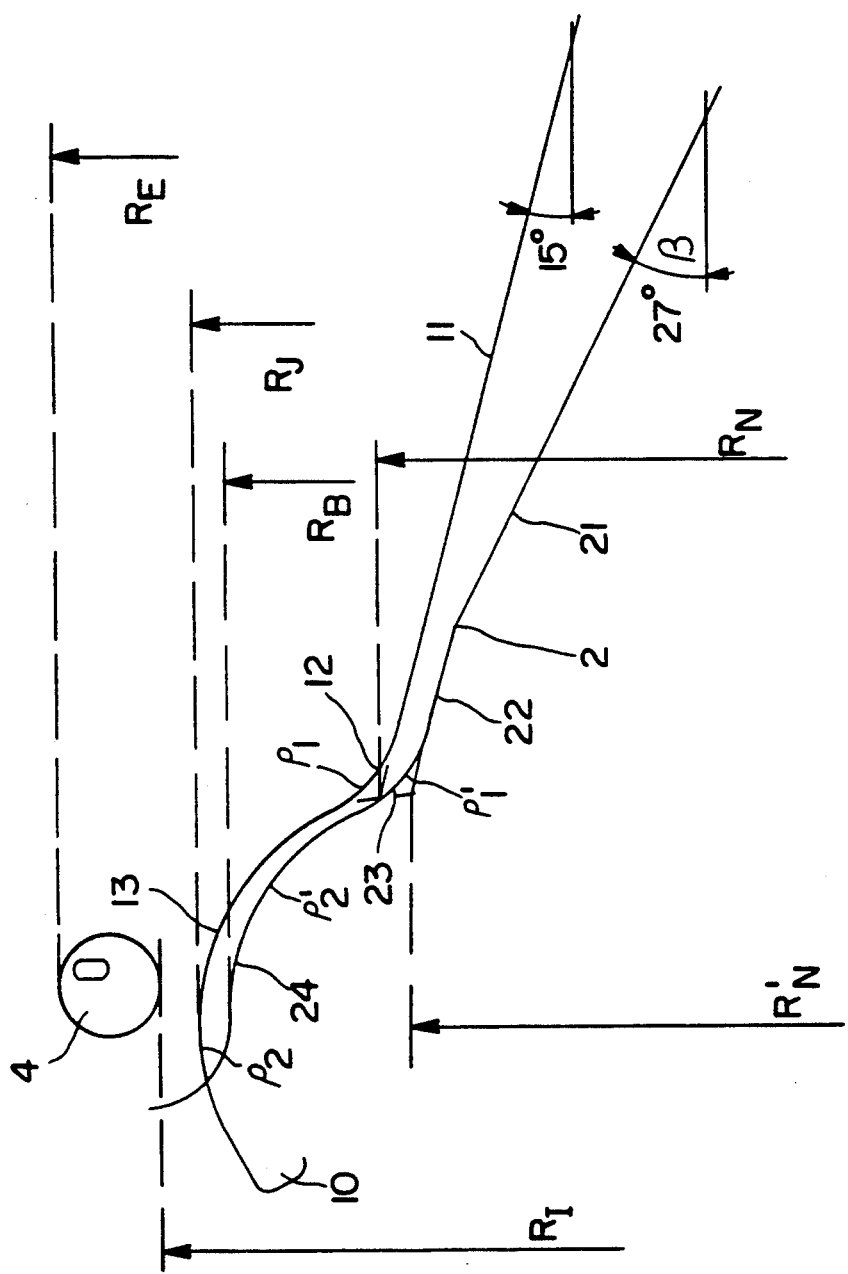
FIG. 2 is a meridian view of the base of the bead of the tire as compared with the profile of the standard rim on which the tire is mounted.

The contour of the part of the 22.5×9.00 rim 10 on which the bead B of the tire will rest, shown in FIG. 2, is formed essentially of a frustoconical seat 11, the generatrix of which forms an angle of 15°±1° with the axis of rotation; said generatrix is connected to a circular arc 13 of radius $\rho_2$ equal to 12.7 mm via a second circular arc 12 of radius $\rho_1$ equal to 8 mm. The nominal radius $R_N$ of the rim is the distance between the point of intersection of the extensions of the generatrix of the conical seat 11 and the circular arc 13 from the axis of rotation of the tire, while the radius $R_J$ of the rim flange is the distance separating the furthest away points from the axis of rotation of said flange.

The contour profile, seen in meridian section, of the base of the bead B of the tire is derived substantially from the profile of the rim 10. The profile of the base of the bead is formed essentially of a frustoconical region 21, 22 having two inclinations connecting to a circular arc 24 via a second circular arc 23.

The generatrix of the bi-frustoconical area 21, 22 forms an angle $\beta$ of 27° for the part 21 with the axis of rotation of the tire and, for the part 22, an angle $\alpha$ of 15°. The radii $\rho'_1$, and $\rho'_2$ of the first and second circular arcs of the base of the bead are equal to the radii $\rho_1$ and $\rho_2$, respectively, of the profile of the rim 10. In the same way as in the case of the rim 10, the nominal radius $R'_N$ of the base 21, 22, 23, 24 of the bead B is defined as, namely, the distance from the axis of rotation of the tire of the intersection of the extensions of the generatrix of the surface 21 with the circular arc 24. The radius $R'_N$ is then less than the radius $R_N$ of the rim 10 by an amount equal to $\Delta R$, with the result, if one calls $R_B$ the radius of the axially outer end of the base of the bead B, that this radius $R_B$ is less than the radius $R_J$, by the same amount $\Delta R$, equal in the case studied to 0.5 mm.

The auxiliary bead ring 4 (FIG. 1) is a bead wire of "braided" type of circular cross section of a radius equal to 5 mm. Its center 0 is in the same plane perpendicular to the axis of rotation as the end of the circular arc 24 and the inner radius $R_I$ of this bead ring 4 is such that the ratio $$\frac{R_J - R_B}{R_I - R_B}$$

is equal to 0.1.

Around the bead ring 4 there is wound a ply 5 of metal cables formed of (3+9) wires of 15/100, giving rise to two layers 51, 52, superimposed on each other, below the main bead ring 3 and extending up to the toe 6 of the bead B, the metal cables forming an angle of 90° with the circumferential direction.

Axially to the outside of the bead ring 4, the profile of the side wall of the tire connects with the end of the arc 24 by a circular arc 25, but any other profile can be used provided that the ply 5 of cables is sufficiently covered with rubber mix in order to withstand external aggression.

A normal endurance test, that is say prolonged travel under normal conditions of pressure and with overload, makes it possible to note the improvement, on the one hand, of the resistance to separation of the auxiliary carcass reinforcement in the bead, which is arranged axially to the outside of the upturn of the carcass reinforcement and, on the other hand, of the wear of the portion of the bead located immediately above the rim flange. Furthermore, travel at low speed, the tire being mounted on the heated and heating rim, makes it possible to evaluate the improvement obtained in the resistance to unwinding of the carcass reinforcement; thus, a tire of the above-mentioned size and of known architecture travels about 5000 km before the carcass reinforcement unwinds, while a tire in accordance with the invention reaches a distance of 20,000 km without any unwinding or other damage in the bead.

I claim:

1. A tire mounted on a rim (10) having frustoconical seats (11) inclined by an angle 15°±1° with respect to the axis of rotation of the tire, having a nominal radius $R_N$ and circular rim flanges (13) of radius $\rho_2$ equal to 12.7 mm and of the radius $R_J$ with respect to the axis of rotation, these flanges being connected to frustoconical seats (11) by circular arcs (12) of radius $\rho_1$ equal to 8 mm, the tire being provided with a radial carcass reinforcement (1), a crown reinforcement formed of at least two crossed plies, and two beads reinforced, respectively, by at least one bead ring (3) around which the carcass reinforcement (1) is anchored, a reinforcement ply (5) of cords or cables, and an auxiliary bead ring (4) around which the ply (5) of cords or cables is wound, said bead ring (4) having an inner surface of radius $R_I$ from the axis of rotation, characterized by the fact that the base (2) of the bead has, seen in meridian section, a profile comprising a generatrix (21, 22) with double inclination with respect to the axis of rotation of the tire, the double inclination including an axially inner portion forming an angle of between 25° and 30° and an axially outer portion forming an angle of between 15° and 20°, said generatrix (21, 22) being extended axially toward an outer surface of the tire by portions (23, 24) forming circular arcs of radii substantially equal to the radii $\rho_1$, $\rho_2$ of the rim radii, the base (2) of the bead having a tip which is furthest from the axis of rotation by a distance of radius $R_B$ less than the radius $R_J$ of the rim flange (13), and the auxiliary bead ring (4) of a modulus of extension of at least 4,000 MPa is located in a portion of the bead which lies above the rim flange (13), such that a ratio $$s = \frac{R_J - R_B}{R_I - R_B}$$

is equal to at least 0.1, and the reinforcement ply (5) of cords or cables, which is wound around the auxiliary bead ring (4) being formed of two layers (51, 52), at least one of which extends to the toe (6) of the bead, the cords or cables forming an angle of between 90° and 45° with the circumferential direction.

2. A tire according to claim 1, characterized by the fact that the auxiliary bead ring (4) is a bead ring of braided type of circular cross section, the cross section having a radius between 5 and 10 mm.

3. A tire according to claim 1, characterized by the fact that the two layers (51, 52) of the ply (5) are at least under the main bead ring (3) superimposed on each other to the toe of the bead.

4. A tire according to claim 3, characterized by the fact that ends of the layers (51, 52) are offset from each other, the layer (52) which is radially on the inside rising into the tip (6) of the bead.

5. A tire according to claim 1, characterized by the fact that the cords or cables of the reinforcement ply (5) are of metal and form an angle of 90° with the circumferential direction.

6. A tire according to claim 1, characterized by the fact that an end of an upturn (50) of the carcass reinforcement (1) is located radially at a radius less than an outer radius of the auxiliary bead ring (4).

7. A tire according to claim 1, characterized by the fact that a depression (7) is created in the side wall of the tire radially above the auxiliary bead ring (4).

* * * * *

UNITED STATES PATENT AND TRADEMARK OFFICE
CERTIFICATE OF CORRECTION

PATENT NO. : 5,323,830
DATED : June 28, 1994
INVENTOR(S) : Diernaz

It is certified that error appears in the above-indentified patent and that said Letters Patent is hereby corrected as shown below:

On the title page: Abstract "tip" should read --toe --.

Col. 6, line 14, "tip" should read --toe --.

Signed and Sealed this

Twenty-sixth Day of September, 1995

*Attest:*

BRUCE LEHMAN

*Attesting Officer*  *Commissioner of Patents and Trademarks*